(12) United States Patent
Schnackenberg et al.

(10) Patent No.: US 7,890,755 B2
(45) Date of Patent: Feb. 15, 2011

(54) HIGH-ASSURANCE WEB-BASED CONFIGURATION OF SECURE NETWORK SERVER

(75) Inventors: Daniel D. Schnackenberg, Auburn, WA (US); Janell Schnackenberg, legal representative, Auburn, WA (US); Kelly S. Bunn, Duvall, WA (US)

(73) Assignee: The Boeing Company, Chicago, IL (US)

( * ) Notice: Subject to any disclaimer, the term of this patent is extended or adjusted under 35 U.S.C. 154(b) by 1358 days.

(21) Appl. No.: 11/365,044

(22) Filed: Feb. 28, 2006

(65) Prior Publication Data

US 2007/0204151 A1    Aug. 30, 2007

(51) Int. Cl.
| | |
|---|---|
| H04L 29/06 | (2006.01) |
| G06F 11/30 | (2006.01) |
| G06F 12/14 | (2006.01) |
| G06F 1/24 | (2006.01) |
| G06F 15/177 | (2006.01) |
| G06F 9/44 | (2006.01) |

(52) U.S. Cl. .................. 713/166; 713/164; 713/165; 713/191; 713/100; 726/11; 726/12; 709/220; 709/221; 717/171; 717/172

(58) Field of Classification Search .................. 713/100, 713/151, 161, 153, 164, 165, 166, 167, 189, 713/191; 726/3, 34; 709/217, 218, 219, 709/222, 223, 225; 717/168, 169, 170, 171, 717/172, 173
See application file for complete search history.

(56) References Cited

U.S. PATENT DOCUMENTS

| | | | | |
|---|---|---|---|---|
| 5,870,550 A | * | 2/1999 | Wesinger et al. ............ 709/218 |
| 5,903,732 A | * | 5/1999 | Reed et al. ................... 709/229 |
| 5,940,591 A | * | 8/1999 | Boyle et al. ..................... 726/3 |
| 5,968,176 A | * | 10/1999 | Nessett et al. ................. 726/11 |
| 6,279,001 B1 | * | 8/2001 | DeBettencourt et al. ........... 1/1 |
| 6,289,462 B1 | * | 9/2001 | McNabb et al. ............... 726/21 |
| 6,684,241 B1 | * | 1/2004 | Sandick et al. ............. 709/220 |
| 6,708,221 B1 | * | 3/2004 | Mendez et al. .............. 709/248 |
| 7,483,965 B1 | * | 1/2009 | Gerraty ...................... 709/221 |
| 2002/0023212 A1 | * | 2/2002 | Proudler ..................... 713/164 |
| 2002/0198968 A1 | * | 12/2002 | Shirriff ....................... 709/220 |
| 2003/0009476 A1 | | 1/2003 | Fomenko et al. |
| 2003/0014466 A1 | * | 1/2003 | Berger et al. ................ 709/102 |
| 2003/0149895 A1 | * | 8/2003 | Choo et al. .................. 713/201 |
| 2003/0233583 A1 | * | 12/2003 | Carley ........................ 713/201 |
| 2004/0034769 A1 | * | 2/2004 | Bacha et al. ................. 713/153 |
| 2004/0128370 A1 | * | 7/2004 | Kortright .................... 709/221 |

(Continued)

OTHER PUBLICATIONS

Niemeyer, "Using Web technologies in two MLS environments: a security analysis," Computer Security Applications Conference, 1997. Proceedings., 13th Annual, vol., No., pp. 205-214, Dec. 8-12, 1997.*

(Continued)

Primary Examiner—Matthew B Smithers
Assistant Examiner—Hilary Branske
(74) Attorney, Agent, or Firm—Ostrager Chong Flaherty & Broitman P.C.

(57) ABSTRACT

A secure network server having an embedded Hyper-Text Transfer Protocol (HTTP) server that is not within its trusted security functionality and that is used to configure the SNS security and networking features.

19 Claims, 4 Drawing Sheets

U.S. PATENT DOCUMENTS

| | | | |
|---|---|---|---|
| 2004/0205069 A1* | 10/2004 | Ishizawa | 707/10 |
| 2005/0144616 A1* | 6/2005 | Hammond et al. | 717/173 |
| 2005/0257244 A1* | 11/2005 | Joly et al. | 726/1 |
| 2006/0236095 A1* | 10/2006 | Smith et al. | 713/153 |
| 2006/0236127 A1* | 10/2006 | Kurien et al. | 713/193 |

OTHER PUBLICATIONS

Kang et al., "A Framework for MLS interoperability," High-Assurance Systems Engineering Workshop, 1996, Proc. IEEE, pp. 198-205.

Smith, R.E., "A Secure Email Gateway (Building an RCAS External Interface)," Comp. Security Applns. Conf., 1994, 10th Annual Proc., pp. 202-211.

Galik, D., et al., "Fielding Multilevel Security into Command and Control Systems," Comp. Security Applns. Conf., 1991, Seventh Annual Proc., pp. 202-208.

IETF CIPSO Working Group, "Commercial IP Security Option (CIPSO 2.2)," IETF Standard-Working Draft, 1992, pp. 1-12.

\* cited by examiner

HIGH-ASSURANCE WEB-BASED CONFIGURATION OF SECURE NETWORK SERVER

BACKGROUND OF THE INVENTION

This invention relates to data transfer between networks operating at different security levels.

High-assurance security products typically are difficult to manage because to minimize the complexity of the trusted security functions, as required to meet Common Criteria EAL-6 and EAL-7 requirements, the administrator interface is typically a very primitive command line interface. The problem is that graphical user interfaces and web-based control, available on most lower-assurance products, require too much complexity in the trusted security functionality. A known Secure Network Server (SNS) product supports a simple command line administrator interface within its trusted security functionality, which administrator interface some users consider to be not easy to use.

There is a need to develop an architecture, design and implementation that still meets the high-assurance requirements of EAL-7 of the Common Criteria, while providing a more user friendly administrator interface.

BRIEF DESCRIPTION OF THE INVENTION

The invention is directed to a secure network server having an embedded web (e.g., Hyper-Text Transfer Protocol (HTTP)) server that is not within its trusted security functionality and that is used to configure the SNS security and networking features.

One aspect of the invention is a method of configuring a secure network server comprising the following steps: (a) downloading modified configuration data to a web server that is within the non-trusted security functionality of a first secure network server having trusted security functionality and non-trusted security functionality; (b) reviewing the modified configuration data using a command line interface that is within the trusted security functionality of the first secure network server; and (c) configuring the first secure network server or a second secure network server connected to the first secure network server in accordance with the modified configuration data in response to the input, via the command line interface, of command data indicating acceptance of the modified configuration data by an administrative user.

Another aspect of the invention is a secure network server having trusted security functionality and non-trusted security functionality, comprising a web server that is within the non-trusted security functionality, an IP router interface that is within the trusted security functionality and a command line interface that is within the trusted security functionality, wherein the HTTP web server receives configuration data via the IP router interface and uses a trusted process to place that configuration data into temporary storage, the secure network server being programmed to configure itself or another secure network server connected thereto in accordance with the configuration data in response to the input, via the command line interface, of command data indicating acceptance of the configuration data by an administrative user.

A further aspect of the invention is a method of configuring a secure network server comprising the following steps: (a) sending configuration data from a web browser that is within the non-trusted security functionality of a computer to a web server that is within the non-trusted security functionality of a first secure network server, the computer being connected to the first secure network server via a network; (b) reviewing the configuration data using a command line interface that is within the trusted security functionality of the first secure network server; and (c) configuring the first secure network server or a second secure network server connected to the first secure network server in accordance with the configuration data in response to the input, via the command line interface, of command data indicating acceptance of the configuration data by an administrative user.

Yet another aspect of the invention is a system comprising first and second secure network servers connected by a trunk line, and first and second networks connected via the second secure network server, the first and second networks operating at different security levels, wherein each of the first and second secure network servers has trusted security functionality and non-trusted security functionality, the first secure network server comprising a web server that is within the non-trusted security functionality, an IP router interface that is within the trusted security functionality and a command line interface that is within the trusted security functionality, wherein the HTTP web server receives configuration data via the IP router interface and uses a trusted process to place that modified configuration data into temporary storage, the first secure network server being programmed to configure itself or the second secure network server in accordance with the configuration data in response to the input, via the command line interface, of command data indicating acceptance of the configuration data by an administrative user.

Other aspects of the invention are disclosed and claimed below.

BRIEF DESCRIPTION OF THE DRAWINGS

Reference will now be made to the drawings in which similar elements in different drawings bear the same reference numerals.

DETAILED DESCRIPTION OF THE INVENTION

Figure 1:
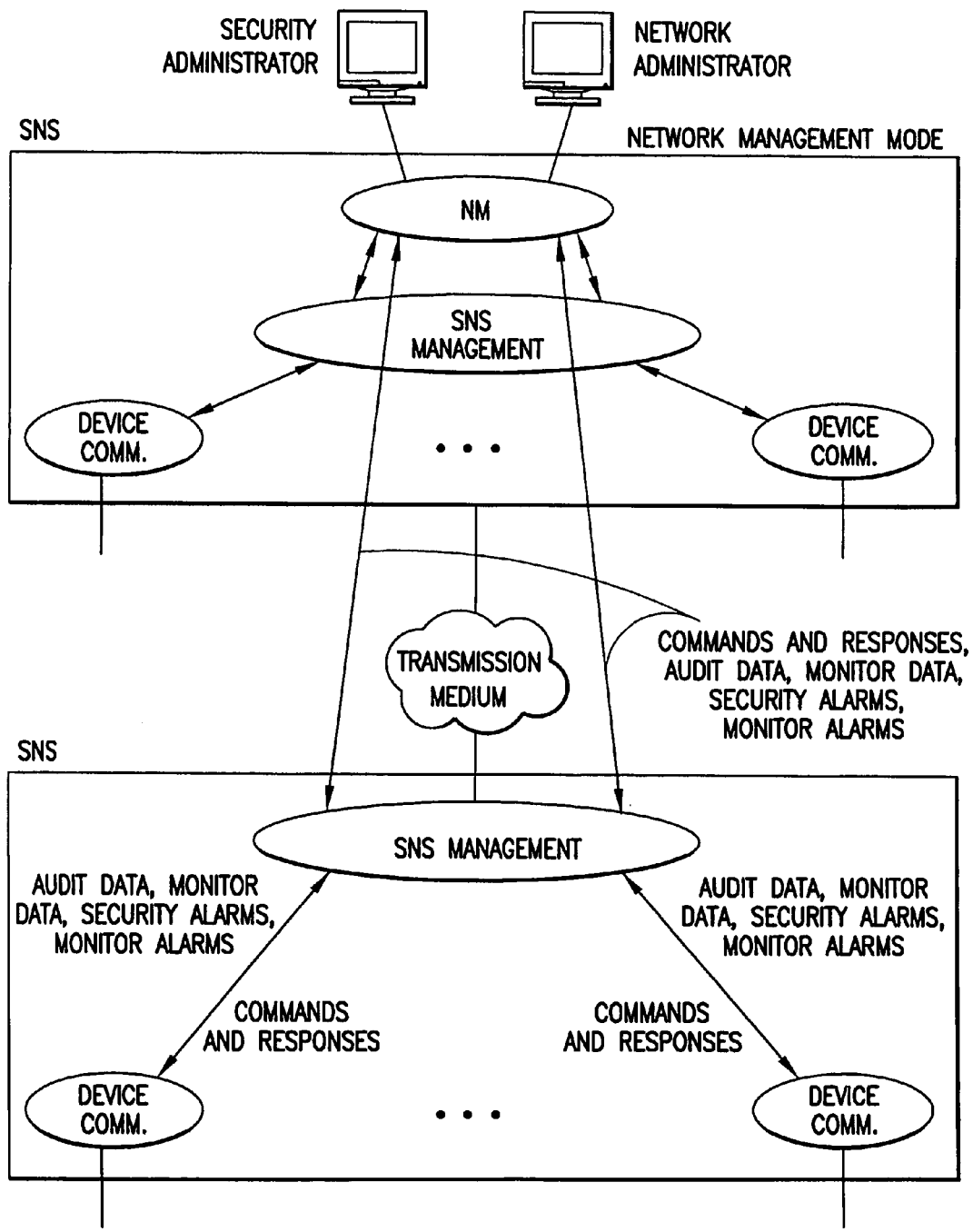
FIG. 1 is a diagram showing the data flow in an SNS system having hierarchical management.

The Secure Network Server (SNS) disclosed herein is a multilevel secure (MLS) Internet Protocol (IP) filtering router, with firewall/guard capabilities, supporting standard protocols, including Transmission Control Protocol (TCP), User Datagram Protocol (UDP), IP Control Message Protocol (ICMP), and Simple Mail Transfer Protocol (SMTP).

The SNS provides users the capability to securely interconnect different security domains. The SNS serves as a filtering router, with the capability to support reliable upgrade, and filtered downgrade of data between security domains. The SNS supports both single-level and multilevel subscriber devices and networks. More specifically, the SNS provides the following subscriber device services: (a) support for unlabeled single-level interfaces through standard IP protocol; (b) support for multilevel interfaces through the Common IP Security Option (CIPSO) labeling standard; (c) IP packet filtering, with filtering rules based on IP protocol, IP source address and mask, IP destination address and mask, TCP/UDP source and destination ports, and ICMP types; (d) routing IP multicast to multiple destinations; (e) e-mail, generic TCP, and simple message transfer protocol proxies, enabling reliable upgrade and filtered downgrade of data; and (f) generic filtering capability for fixed format messages, email and XML messages. Filtering rules are defined in a file downloaded to the SNS.

The SNS provides the following network management (NM) services: (a) control of one or more SNSs through a single network management node; (b) support for "warm spare" approach to fail-over of the network management node; (c) administrative control of SNS security and networking features through a command line interface; (d) review of network audit and monitor trails through the command line interface; (e) real-time streaming of SNS audit data to an attached audit server; (f) separation of duty between security and network administration of the system; and (g) SNS control.

The SNS in accordance with the disclosed embodiment connects to subscriber devices using standard Ethernet operating at 10/100 Mbps, plus Gbps Ethernet. A system of SNSs comprises multiple chasses interconnected through a private inter-SNS trunk (indicated in FIG. 1 by the cloud labeled "TRANSMISSION MEDIUM"). One of the SNSs is designated as the current NM node. Alternate NM nodes can be used, but only one can be active at a time.

At the network layer, the SNS in accordance with the disclosed embodiment supports standard IP and ICMP. The SNS routing mechanisms support both unicast and multicast IP. For multicast IP, the SNS enables users to enter multicast delivery through one or more SNSs to multiple networks or devices.

At the transport level, the SNS in accordance with the disclosed embodiment can route any protocol that resides atop IP. In particular, the SNS provides proxies for TCP-based applications, enabling reliable upgrade and downgrade for these applications. The SNS in accordance with the disclosed embodiment provides three application proxies: SMTP, TCP, and a simple message transfer protocol. All three provide reliable upgrade. The SNS in accordance with the disclosed embodiment also provides content filtering for both upgrade and downgrade of messages. The SMTP proxy enables filtering based on e-mail addresses. Content filters for e-mail, TCP and the simple message transfer protocol are defined using an offline Java-based tool. Constraints can be defined for e-mail, fixed format binary messages or XML messages. Constraints include range validation for numeric fields, validation against a specified list of alternatives for any field, and dirty word filtering for text fields. The filters can be configured to either alter or remove some message fields. Messages that fail to meet the criteria specified are logged and discarded.

The SNS in accordance with the disclosed embodiment uses a distributed NM approach, with a centralized NM node providing system-level monitoring and control, and distributed NM software in the SNSs providing local management support. Any SNS can serve as the central NM node. Multiple NM nodes are supported, provided they have compatible configuration databases. Only one NM node can be active at a time. An NM node is made active through a single command at the network administrator console. The SNS in active NM mode uses its private inter-SNS trunk to manage the other SNSs.

In addition to the NM node, the SNS provides an optional audit server interface, enabling audit and monitor data to be transferred in real-time to an attached device.

The NM central node provides a command line interface that separates the security and network administrative functions. NM also provides a utility console that can be used for backup and recovery of the system configuration, as well as archive of the system audit and monitor trails. The command line interface is part of the trusted functionality (i.e., NTCB) of the SNS that is programmed to operate in a network management mode.

The network administrative functions include the following: (a) SNS control, including initialization, shut down, and restart of subscriber device interfaces, SNSs, the NM interface, and the full SNS system; (b) SNS performance management; (c) SNS configuration management, including specification of device-to-SNS connectivity and IP filtering rules; (d) SNS monitoring, including collection, storage, and display of SNS status and performance statistics; and (e) SNS time, including initialization and distribution of SNS time to all SNS nodes in the SNS.

The security administrative functions include the following: (a) security control, including shutdown and restart of subscriber device interfaces, SNSs, and the full SNS system; (b) security configuration management, including establishment and maintenance of a database of user privileges, device sensitivity ranges, and other SNS security parameters; (c) security monitoring, including collection, storage, and display of security audit data, and generation of real-time security alarms; (d) user authentication support, including establishment and maintenance of a database of user identities and passwords, as well as other user data; and (e) translation between logical sensitivity level names and the SNS internal format.

The SNS in accordance with the disclosed embodiment also enables web-based configuration of filter control files. This capability is controlled through the security administrator interface. Administrative personnel use a standard web browser to download to the SNS filter control files. The control files must be approved for use through the command line interface to prevent malicious insertion of rule changes.

The SNS network in accordance with the disclosed embodiment comprises a network trusted computing base (NTCB), which is designed to act as a reference monitor for network resources. The reference monitor requirements are that it be of minimal complexity, always invoked on object access, and tamper-proof.

One objective of the SNS is to provide sufficient protection mechanisms to provide host-specified session separation. This implies that the network must provide a trusted path, as well as ensure that process-to-process communication between host processes meets the mandatory and discretionary access control policies specified in the TNI.

An SNS in accordance with the disclosed embodiment provides network security functions for host-to-host connections, and datagram services (IP). Proxied host-to-host connection-oriented communication is provided using TCP, SMTP over TCP or a simple messaging service over TCP. This includes ensuring that data is not sent (or received) at a sensitivity level other than what is permitted for a sender (or receiver). Each SNS proxied connection operates at a single sensitivity level; however, the network supports multiple connections or sessions at different sensitivity levels.

All devices (hosts, workstations) attached to the network have associated maximum and minimum sensitivity levels. The minimum must be at or below the maximum. If the host is single-level, the maximum sensitivity level is the same as the minimum sensitivity level. Other devices are single-level, but may operate at multiple sensitivity levels within their range. The device user controls this. The host is responsible for ensuring that users can only operate at sensitivity levels for which they are cleared.

In accordance with the disclosed embodiment, hosts or remote networks that use IP may be connected to an SNS over an IEEE 802.3 interface. IP interfaces may be configured as one of (1) IP host, (2) IP router, or (3) audit server. IP hosts and routers are provided standard IP service, and can be configured as either multilevel or single-level. Single-level IP hosts and routers may be configured to be either labeled or unlabeled. Audit server hosts are only allowed to receive data from the SNS, and are delivered, using standard UDP/IP, SNS audit and monitor data and alarms.

FIG. 1 illustrates the internal SNS design in accordance with the disclosed embodiment. The ovals represent tasks and task groups while rectangles represent functional components, subsystems or hardware.

The NM node provides central management of the SNS system, including security administrator (SA) and network administrator (NA) interfaces to control the status of all network components. Each SNS has a central manager ("SNS MANAGEMENT" in FIG. 1) providing direct support for network startup, component shutdown and restart, and monitor and audit data collection. Startup, shutdown, and restart commands from network management (NM) are sent to the SNS central manager and then to the device communications task groups ("DEVICE COMM." in FIG. 1). Responses to NM commands and audit data are collected by the SNS central manager from the device communications task groups and forwarded to NM.

In accordance with the disclosed embodiment, write-up from a lower-level host to a higher-level host is achieved with two degrees of reliability. In order of increasing reliability, the two write-up methods are (a) IP and UDP; and (b) application proxies over TCP. Application proxies support SMTP, TCP, or a simple message transfer protocol. IP and UDP are datagram services that do not use acknowledgments and are only as reliable as the link hardware, transmission medium, and each component's ability to keep up with the incoming data.

Figure 2:
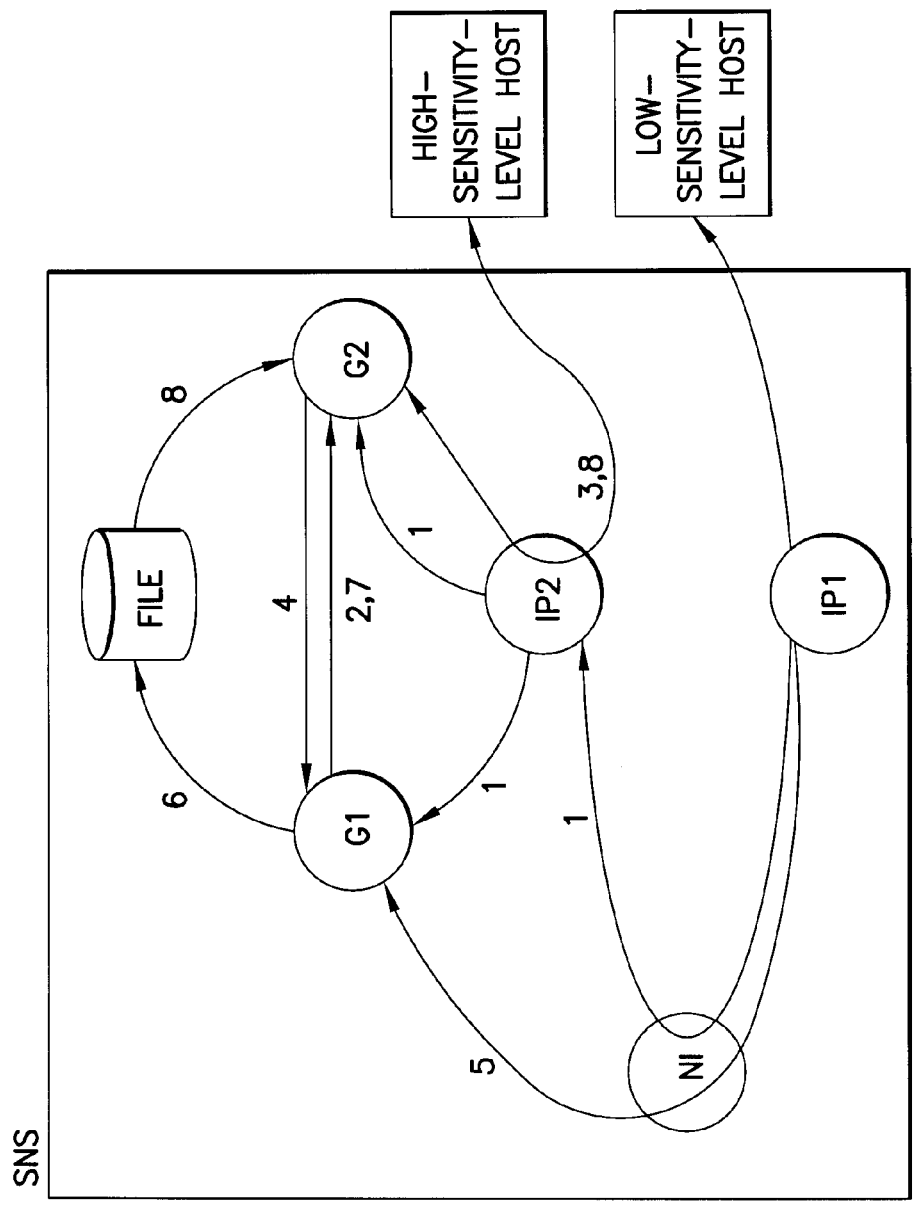
FIG. 2 is a diagram showing a TCP session established in an SNS for proxy write-up from a lower-sensitivity-level host to a higher-sensitivity-level host.

TCP sessions may be established to a host attached to a proxy gateway interface that is operating at a different sensitivity level than the source. The purpose of this capability is to enable reliable data transfer from a source at a lower sensitivity level host to a destination host at a higher sensitivity level. FIG. 2 shows how these sessions are established through the SNS. The source host must initiate the connection and specify the connection sensitivity level. The sensitivity level specified by the source host must be within its sensitivity level range. The destination host must be authorized to participate in write-up connections. The SA grants and revokes this authorization. The connection establishment and data transfer occurs in the following steps:

(1) On initiation of the connection, the SNS creates both task groups needed for the upgrade (G1 and G2 in FIG. 2).

(2) Task Group G1 sends a message to Task Group G2 to let the latter know that Task Group G1 has been created and Task Group G2 can complete the connection.

(3) Task Group G2 establishes the TCP connection with the destination host via IP interface task group IP2.

(4) Task Group G2 then sends a message (e.g., a binary value) to Task Group G1 that indicates that the TCP connection with the destination host has been established.

(5) In response to receipt of the message indicating that the TCP connection with the destination host has been established by Task Group G2, Task Group G1 then completes TCP connection establishment with the source host via network interface task group NI and IP interface task group IP1. In a typical write-up connection, the source host then begins transmitting data.

(6) The Task Group G1 executes the proxy protocol with the source host and stores the message locally in the SNS file system ("FILE" in FIG. 2).

(7) Once the message transfer is complete, Task Group G1 forwards the message to Task Group G2.

(8) Task Group G2 reads the data from the file and executes the proxy protocol with the target host to forward the data to the destination host via IP interface task group IP2.

For the connection to be established as a write-up connection, the following must be true: (a) The sensitivity level specified by the source host must be dominated by the destination host's maximum sensitivity level. (2) The destination host must be authorized to establish this connection type (i.e., the destination host must have write-up privilege, which is granted by the network SA) for the write-up to occur.

The SNS also enables filtering of upgrade messages. The process is similar to that described above, however, the SNS also creates a third, NTCB, task group that is inserted between Task Groups G1 and G2 in FIG. 2. That third task group receives messages from Task Group G1 and forwards validated messages to Task Group G2 for forwarding to the host. The process for establishing the connection and transferring data is the same as that used for downgrade proxies, described hereinafter.

The SNS provides filtering of connections from high to low. The process is similar to that described above; however, for downgrade, there must be a filter task group for the outbound interface. For upgrade the filter is optional. The SA controls downgrade through multiple mechanisms: (a) The sensitivity level specified by the source host must be dominated by the destination host's maximum downgrade sensitivity level. (b) The outbound interface must be designated by the SA as a downgrade interface. (c) The SA must specify which proxy type and filter type is to be used at the outbound interface based on the TCP port number. (d) The SA must specify support files used by the filter.

Figure 3:
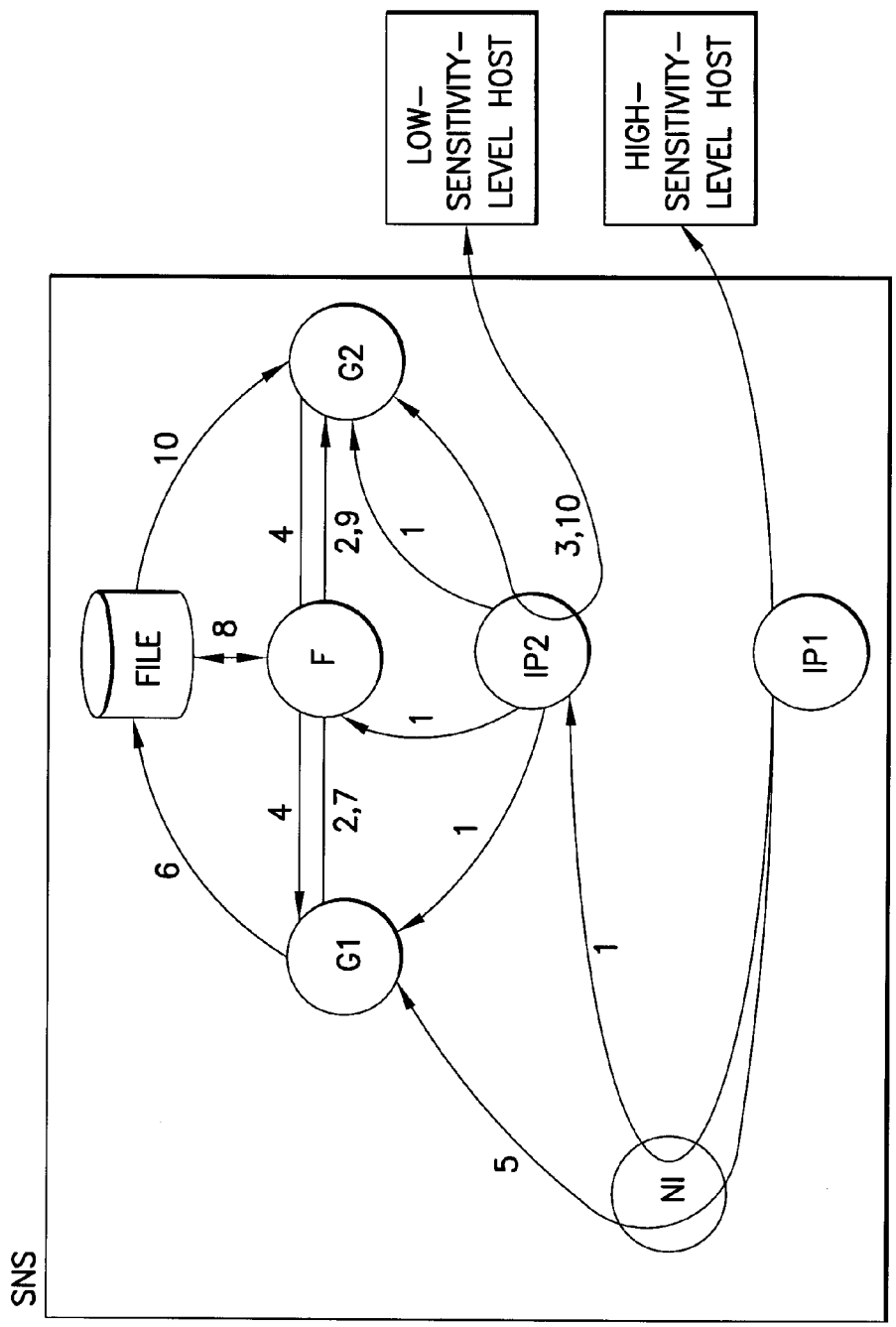
FIG. 3 is a diagram showing a TCP session established in an SNS for proxy downgrade from a higher-sensitivity-level host to a lower-sensitivity-level host.

The major differences from the above process is that in step 1, the SNS also creates a third, NTCB filter task group that is inserted between Task Groups G1 and G2 in FIG. 3. The initialization and reception of messages by Task Group G1 (steps 1-6) is the same for upgrade and downgrade; however, in step 7, where Task Group G1 forwards data, Task Group G1 sends the data to Task Group F instead, as shown in FIG. 3. The subsequent steps are as follows:

(7) The filter task group F receives the data from Task Group G1.

(8) The filter task group F filters the data based on the rule set specified by the SA.

(9) On success, the filter task group F forwards the data for validated messages to Task Group G2 for forwarding to the host.

(10) Task Group G21 reads the data from the file and executes the proxy protocol with the target host to forward the data to the destination host via IP interface task group IP2.

Note that the process for downgrade filtering is identical to that for upgrade filtering. The SNS has a standard set of proxies and a standard filter. The filter is controlled by a file that specifies the filtering rules for the port number for a specific interface.

Custom proxies and filters can be added to the SNS, but require additional software to be integrated into the system. Such proxies and filters use a standard framework, so that their operation is identical to what is described above. New proxies require no modification to the core algorithms in the SNS, just changes to the command language to allow specification of the new proxy. Filters are part of the NTCB, and so integrating a new filter is a more significant change to the SNS.

In accordance with the above-described embodiment, both the forwarding process and the receiving process are created upon connection initialization, and the receiving process is held off from communicating with the source host until the forwarding process has created a connection with the destination host. This solves the problem of message loss when the destination host is unreachable.

Figure 4:
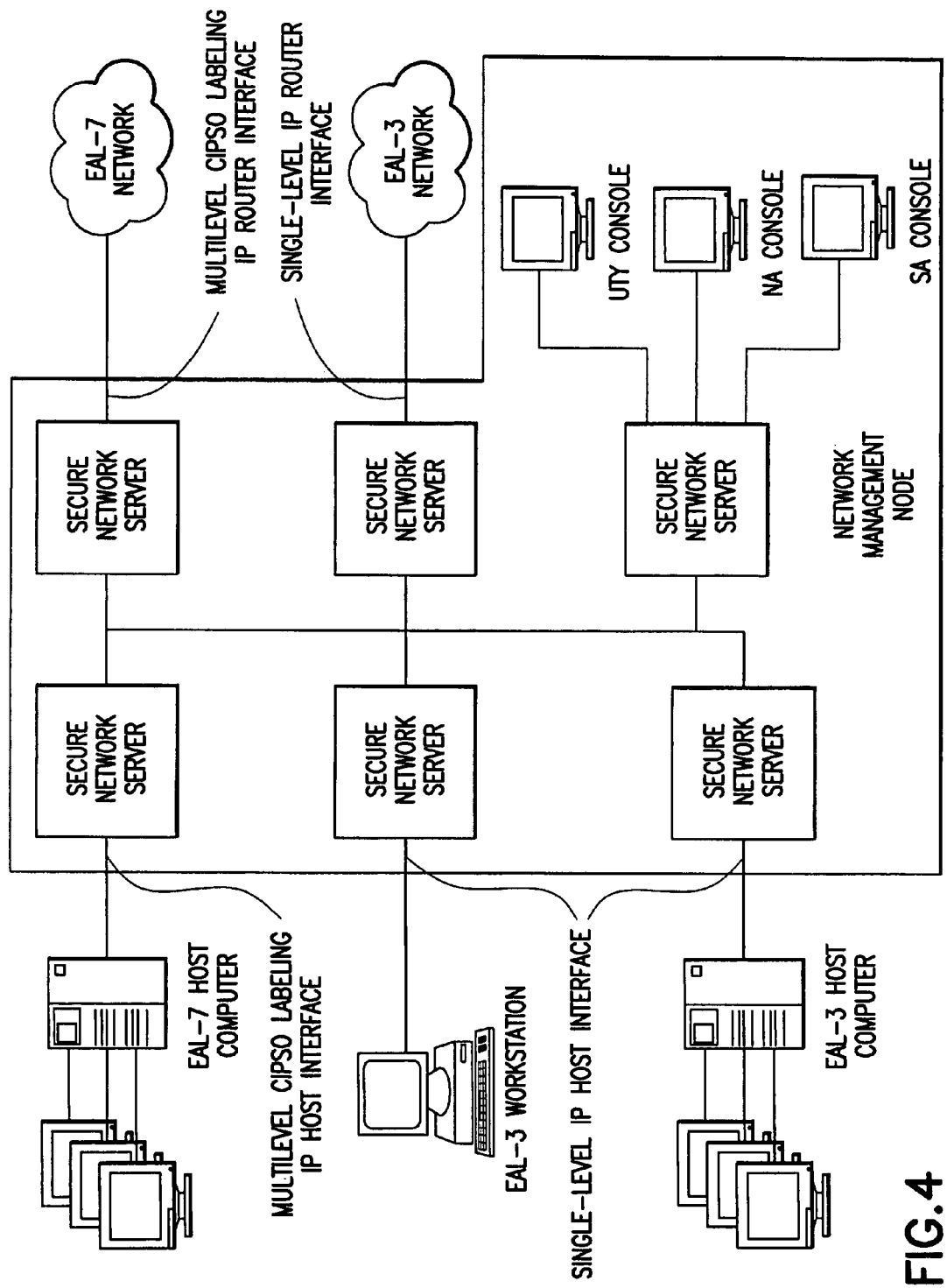
FIG. 4 is a block diagram showing an exemplary SNS configuration.

Hereinafter, how to configure and interconnect automated information system components to construct a distributed system, using SNSs to connect the components, and achieve a desired level of system assurance, will be described. Requirements to maintain a high level of system assurance using SNSs to interconnect system devices are presented, including necessary device characteristics and SA actions. FIG. 4 presents an exemplary EAL-7 configuration.

An SNS supports hosts through an IP host or IP router interface. As seen in the exemplary SNS configuration depicted in FIG. 4, a multiplicity of secure network servers (SNSs), including a Network Management Node SNS, are interconnected via a network. The SNS shown in the upper row and on the right-hand side of the configuration is connected to a network having an Evaluation Assurance Level of EAL-7 by way of a multilevel CIPSO labeling IP router interface. The SNS shown in the upper row and on the left-hand side of the configuration is connected to a host computer having an Evaluation Assurance Level of EAL-7 by way of a multilevel CIPSO labeling IP host interface. The SNS shown in the middle row and on the right-hand side of the configuration is connected to a network having an Evaluation Assurance Level of EAL-3 by way of a single-level IP router interface. The SNS shown in the middle row and on the left-hand side of the configuration is connected to a workstation having an Evaluation Assurance Level of EAL-3 by way of a single-level IP host interface. The SNS shown in the lower row and on the left-hand side of the configuration is connected to a host computer having an Evaluation Assurance Level of EAL-3 by way of a single-level IP host interface. The network management node SNS can be accessed by an authorized user via a security administrator (SA) console, a network administrator (NA) console and a utility (UTY) console. Each host attached to the SNS must provide the authentication mechanisms, discretionary access enforcement, and audit mechanisms necessary to meet the system-level requirements. Hosts attached to the SNS through an MLS interface (i.e., the interface's maximum and minimum sensitivity levels are not the same) must also provide mandatory access controls. The assurance level for such MLS hosts must also meet the system-level assurance requirements. That is, if an MLS attached host is rated as EAL-N, where N is a positive integer, then the system provides EAL-N assurance for the range of sensitivity levels assigned to that host by the system SA.

If all SNS interfaces to a host (IP) are configured to operate at the same sensitivity level, then the host is single-level from the point of view of the network. A network of single-level hosts, connected through a system of SNSs, results in a system that has EAL-7 assurance.

There are two possible scenarios that make a host's interface to the SNS multilevel: (a) more than one single-level interface, where two of the interfaces are configured to operate at different sensitivity levels; and (2) an IP interface configured to operate at multiple sensitivity levels. In both cases, the host must meet the system-level assurance requirements. Connecting lower assurance multilevel hosts through the SNS results in a system where the system-level assurance is reduced to that of the lowest assurance MLS host. However, if the hosts are constrained by the SNS to small sensitivity ranges, the security risk can be reduced.

For IP interfaces, the host's range of sensitivity levels assigned by the SA must be consistent with the sensitivity levels assigned by the host administrator to the host's side of the interface.

In accordance with the disclosed embodiment, the SNS supports management of SNS filtering rule sets from remote hosts. The SA controls which interface can be used for this capability by setting the "Trusted Configuration Server" control for the management interface. The SNS enables use of a standard web browser to support this feature, plus a custom Java tool for creating SNS filtering rule sets. The SNS provides safeguards against compromise through this interface. Besides limiting which host interfaces can use this mechanism, the SNS validates all input to ensure that it is valid and consistent filtering rules, and requires review by the system SA before accepting the filtering rule set file into the system.

Administrators use the Java-based tool to define filtering rule sets. These rule sets are downloaded to the SNS over HTTP. To support low-assurance hosts performing this management function and to minimize the complexity of the SNS's NTCB, the HTTP web server on the SNS operates as a non-NTCB task group.

Tasks are the principal active entities managed by the executive; however, task groups form the unit of encapsulation provided by the executive. Task groups are either NTCB or non-NTCB. The executive enforces a policy of complete separation of non-NTCB task groups. The executive keeps track of which tasks belong to each task group, and ensures that non-NTCB task groups do not share data or even communicate.

The security and networking features of each SNS can be configured using an HTTP web server task group (non-NTCB) embedded in the network management SNS. This web server is accessible to administrators through a standard web browser on a computer that connects to the network management SNS via a network. The configuration of an SNS can be modified by downloading modified configuration data from the web browser on the remote computer to the web server on the network management SNS via the HTTP interface. These changes in SNS configuration are reviewed and accepted using a command line interface that is part of the trusted security functionality of the network management SNS. This allows the web server to be outside the SNS's trusted security functionality.

In the disclosed embodiment, the HTTP web server within the network management SNS is a standard SNS proxy process that is created when an HTTP session is created with the network management SNS's router address as the target host. The SNS security administrator controls this feature by setting a configuration flag for each Ethernet interface that is used as an IP router interface. If the configuration flag is not set, the interface will not allow the web server to be created.

Upon creation, the web server uses a trusted process in the network management SNS to read the SNS configuration data and present forms to the administrative user over HTTP. The administrator uses a standard HTTP web browser at a remote computer to enter data in the forms and submit the data to the network management SNS. The web server uses the same trusted process to place the modified configuration data into temporary storage for review by administrators using the command line interface of the network management SNS. After both network and security administrator review of the changes, the changes are accepted into the SNS for use. This approach can be used for most SNS configuration parameters. Secure Sockets Layer (SSL) and other security mechanisms (e.g., user authentication) can be used to provide additional security across the Ethernet interface from the SNS to the client web browser, although none of these mechanisms is required to ensure that the data entered is correct configuration data.

The executive does not associate sensitivity levels with tasks, however, the session manager that creates a single-level task group records that task group's sensitivity level. The executive does not require any information about sensitivity levels, because the policy enforced by the executive is one of complete separation and is not based on the sensitivity levels of the tasks. All non-NTCB tasks within a task group operate at the same sensitivity level. When a task has access to a data segment in memory, it has both read and write access. Thus the sensitivity level of the data segments to which a non-NTCB task has access is the same as the task's sensitivity level. NTCB tasks have no sensitivity level. They typically provide services that require operation at multiple sensitivity levels. All the NTCB tasks are verified to operate securely.

TCP call gates are provided for filter and application proxy task groups to initialize, send data to and receive data from the network, send files between proxies, and send error reports to the IP Interface task group. TCP call gates are called by proxy task groups and use the executive.

A file system separates a disk into NM and user partitions. This separation provides a mechanism that prevents NM from having to compete with user task groups for resources.

A file mover task group is used by the web server task group to move files between the NM and user partitions. The web server task group enables download of filter rule set files. The file mover task group receives file names from the web server through an executive mailbox. The file mover task group copies a file from the user partition to a temporary directory in the NM partition. Files in the temporary directory in the NM partition are ready for review by the SA before the file can be used in configuring proxies. The file mover software interfaces with web server (via executive), executive, and IP interface software. The file mover task group is part of the trusted security functionality, while the web server task group is part of the non-trusted security functionality of the SNS.

A generic filter process provides filtering for messages received in the SNS through non-NTCB proxies. The generic filter can filter e-mail, XML messages or fixed format messages. Filtering is controlled by a message filter task group file that specifies filtering rules. Filter task group files are assigned to the filter in the proxy table setup by the SA when adding proxies. Separate filter task group files can be specified for separate proxy specifications. The filter task group file specifies rules for message fields. For e-mail and XML messages, fields are defined by tags. For fixed format messages, fields are defined by offset into the message. Filter rules include type-dependent filters. For number types, range and discrete value checks can be specified. For text fields, discrete values or dirty word searches can be specified. Actions can be specified that enable discarding the message, stripping out a field for e-mail or XML messages, replacing a field for e-mail or XML messages, or zeroing a field for fixed format messages.

The filter rules can be specific to the source IP address for the sender of the message. The filter task group file format allows specification of source address and mask for a set of rules. This enables source or interface specific filtering rules. The filter task groups interface with the IP software, TCP gates, proxy task groups (via TCP gates), and executive.

Custom filters can be added to the SNS using a filter development framework. The framework provides the initialization and termination software, so that only a filtering 'c' program is needed to provide filtering capabilities. Custom filters are used when the generic filter does not provide sufficient functionality. Custom filters alter the NTCB, so their use should be minimized. However, the changes are localized to just the filtering algorithm, which reduces the security risk. The custom filter task groups interface with the IP software, TCP gates, proxy task groups (via TCP gates), and executive.

Proxy task groups support a protocol for transfer of data through the SNS. The SNS in accordance with the disclosed embodiment has the following types of proxies: (a) TCP; (b) SMTP; and (c) message transfer protocol. The TCP proxy task group forwards TCP segments through the SNS. The SMTP proxy task group provides the standard SMTP protocol for the IP interface. SMTP messages are forwarded through the SNS.

The SNS disclosed herein is a high-assurance, multi-level security (MLS) network guard that enables information sharing across network boundaries, while enforcing established security and policy rules. The SNS allows: interconnection of single-level networks, hosts, and workstations that operate at different levels; connection of single-level networks, hosts, and workstations into a multilevel network; separation of multi-level components that have different accreditation ranges; routing of data between multilevel and single-level networks; one-way transfer of data from a lower security enclave to higher security level workstations, hosts, or networks; movement of e-mail between multiple security levels consistent with security and policy rules as an e-mail firewall; one-way transfer of data from a higher security enclave to lower security level workstations, hosts, or networks based on a predefined downgrade rule set; information upgrade to a higher domain; and message downgrade and release to a lower domain, subject to downgrade filter rules.

The SNS, configured as a high-assurance guard, can be used to exchange information between enclaves at different security classification levels. Public information from external, unclassified networks can be transmitted securely into classified networks without compromising sensitive or classified information. A two-stage proxy scheme is used within the SNS to ensure that unclassified information is transferred into the SNS and then upgraded to a classification level appropriate to the target network.

This approach prevents any sensitive or classified information from being exposed to the unclassified network by breaking the transaction into a "low" process and a "high" process within the SNS. In this way, the results from processes running on unclassified systems could be safely used as input to other processes running on classified systems. For example, real-time weather forecasts could be pulled from public sources and pushed into highly sensitive networks for use in operational planning.

Automated downgrade techniques can be implemented within the SNS to facilitate communications from a "high" network to a "low" network by adding approved filters to this two-stage proxy technique. In this way, a preauthorized set of messages could be sent from a classified system to the external, unclassified simulations (e.g., situation reports, 'start,' 'pause,' and 'stop' commands, etc.) or approved information could be downgraded from a classified system for use in an unclassified network.

The SNS supports both single-level and multi-level interfaces. Security labels are added and deleted from network traffic, as needed, by using the industry standard Commercial Internet Protocol Security Options (CIPSO) field in the IP header. These CIPSO labels support both hierarchical security classification domains and non-hierarchical "need-to-know" compartments. This approach supports current single-level networks as well as networks containing MLS or compartmented workstations.

Single-level data read into the SNS is tagged internally to the SNS using the CIPSO labels. The label assigned is that of the interface that the data came from. As the data moves through the SNS, the label is revised as appropriate. Assuming the receiving host is single level, then the tag is stripped off by the SNS prior to the data being transmitted to the receiving host. However, if the receiving host has multilevel security, then the CIPSO labels can be retained.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of configuring a secure network server comprising the following steps:
   separating a disk of a network management secure network server into network management and user partitions;
   creating an HTTP web server task group when an HTTP connection is initiated with said network management secure network server's router address as an IP destination address, said HTTP web server task group being part of a non-trusted security functionality of said network management secure network server;
   uploading a file containing modified configuration data from a remote computer to said network management secure network server, said HTTP web server task group receiving said uploaded file via an IP router interface that is within a trusted security functionality of said network management secure network server and storing said received file in said user partition of said network management secure network server;
   copying said modified configuration data file from said user partition to said network management partition on said disk of said network management secure network server;
   reviewing said modified configuration data in said modified configuration data file in said network management partition using a command line interface that is part of the trusted security functionality of said network management secure network server; and
   configuring said network management secure network server or a second secure network server connected to said network management secure network server in accordance with said modified configuration data in response to the acceptance, via said command line interface, of said modified configuration data by an administrative user,
   wherein said copying step is performed by a file mover task group that is part of the trusted security functionality of said network management secure network server.

2. The method as recited in claim 1, wherein said modified configuration data comprises filtering rules.

3. The method as recited in claim 1, wherein said modified configuration data comprises specifications of device-to-secure network server connectivity.

4. The method as recited in claim 1, further comprising the step of setting a configuration flag for said IP router interface of said network management secure network server, wherein if said configuration flag is not set, said IP router interface will not allow said HTTP web server task group to be created.

5. A secure network server having trusted security functionality and non-trusted security functionality, comprising a disk that has been separated into network management and user partitions, an HTTP web server task group that is within the non-trusted security functionality, a file mover task group that is within the trusted security interface, an IP router interface that is within the trusted security functionality and a command line interface that is within the trusted security functionality, wherein said HTTP web server task group stores configuration data in said user partition on said disk which said HTTP web server task group received via said IP router interface, and said HTTP web server task group causes said file mover task group to copy that configuration data from said user partition to said network management partition on said disk, the secure network server being programmed to configure itself or another secure network server connected thereto in accordance with said configuration data in response to acceptance, via said command line interface, of said configuration data by an administrative user.

6. The server as recited in claim 5, wherein said configuration data comprises filtering rules.

7. The server as recited in claim 5, wherein said configuration data comprises specifications of device-to-secure network server connectivity.

8. The server as recited in claim 5, wherein said secure network server is further programmed to create said HTTP web server task group in response to initiation of an HTTP connection with the router address of said secure network server as an IP destination address.

9. The server as recited in claim 8, wherein if a configuration flag of said IP router interface is not set, said IP router interface will not allow said HTTP web server task group to be created.

10. A system comprising first and second secure network servers connected by a trunk line, and first and second networks connected via said second secure network server, said first and second networks operating at different security levels, wherein each of said first and second secure network servers has trusted security functionality and non-trusted security functionality, said first secure network server comprising a disk that has been separated into network management and user partitions, an HTTP web server task group that is within the non-trusted security functionality, a file mover task group that is within the trusted security functionality, an IP router interface that is within the trusted security functionality and a command line interface that is within the trusted security functionality, wherein said HTTP web server task group stores configuration data in said user partition on said disk which said HTTP web server task group received via said IP router interface, and said HTTP web server task group causes said file mover task group to copy that configuration data from said user partition to said network management partition on said disk, said first secure network server being programmed to configure itself or said second secure network server in accordance with said configuration data in response to acceptance, via said command line interface, of said configuration data by an administrative user.

11. The system as recited in claim 10, further comprising a computer connected to said first secure network server via a third network, wherein said configuration data is downloaded to said first secure network server using a web browser on said computer.

12. The system as recited in claim 10, wherein said first secure network server is further programmed to create said HTTP web server task group in response to initiation of an HTTP connection with the router address of said first secure network server as an IP destination address.

13. The system as recited in claim 12, wherein if a configuration flag of said IP router interface is not set, said IP router interface will not allow said HTTP web server task group to be created.

14. The method as recited in claim 1, wherein said file mover task group receives a file name of said modified configuration data file from said HTTP web server task group via an executive mailbox.

15. The method as recited in claim 1, wherein said HTTP web server task group will not be created unless a configuration flag has been previously set by an administrative user.

16. The method as recited in claim 1, wherein said modified configuration data is inputted using a standard HTTP web browser at said remote computer.

17. A method of configuring a secure network server comprising the following steps:
separating a disk of a network management secure network server into network management and user partitions;
uploading a file containing modified configuration data from a remote computer to said network management secure network server, wherein an HTTP web server task group that is within a non-trusted security functionality of said network management secure network server receives said uploaded file via an IP router interface that is within a trusted security functionality of said network management secure network server and stores said received file in said user partition of said network management secure network server;
sending a file name of said modified configuration data file to a file mover task group through an executive mailbox, said file mover task group being part of the trusted security functionality of said network management secure network server, said sending step being performed by said HTTP web server task group;
copying said modified configuration data file from said user partition to said network management partition on said disk of said network management secure network server, said copying step being performed by said file mover task group;
reviewing said modified configuration data in said modified configuration data file in said network management partition using a command line interface that is part of the trusted security functionality of said network management secure network server; and
configuring said network management secure network server or a second secure network server connected to said network management secure network server in accordance with said modified configuration data in response to the acceptance, via said command line interface, of said modified configuration data by an administrative user.

18. The method as recited in claim 17, further comprising the step of creating said HTTP web server task group when an HTTP connection is initiated with said network management secure network server's router address as an IP destination address.

19. The method as recited in claim 17, further comprising the step of setting a configuration flag for an IP router interface of said network management secure network server, wherein if said configuration flag is not set, said IP router interface will not allow said HTTP web server task group to be created.

* * * * *